United States Patent
Chang

(10) Patent No.: US 9,850,698 B2
(45) Date of Patent: Dec. 26, 2017

(54) GRAY CODE DRIVING DEVICE FOR ELECTRIC ROLLER SHUTTER

(71) Applicant: Yi-Kai Chang, Taichung (TW)

(72) Inventor: Yi-Kai Chang, Taichung (TW)

(73) Assignee: RHINE ELECTRONIC CO., LTD., Taichung (TW)

( * ) Notice: Subject to any disclaimer, the term of this patent is extended or adjusted under 35 U.S.C. 154(b) by 418 days.

(21) Appl. No.: 14/590,857

(22) Filed: Jan. 6, 2015

(65) Prior Publication Data

US 2016/0197537 A1 Jul. 7, 2016

(51) Int. Cl.
| | |
|---|---|
| *E06B 9/68* | (2006.01) |
| *E05F 15/00* | (2015.01) |
| *H02K 11/00* | (2016.01) |
| *E05F 15/668* | (2015.01) |
| *H02K 11/22* | (2016.01) |
| *H02K 11/24* | (2016.01) |
| *E05F 15/665* | (2015.01) |

(52) U.S. Cl.
CPC .............. *E05F 15/668* (2015.01); *E06B 9/68* (2013.01); *H02K 11/22* (2016.01); *H02K 11/24* (2016.01); *E05F 15/665* (2015.01); *E05Y 2400/32* (2013.01); *E05Y 2400/334* (2013.01); *E05Y 2400/337* (2013.01); *E05Y 2900/106* (2013.01); *E05Y 2900/146* (2013.01); *E06B 2009/6854* (2013.01)

(58) Field of Classification Search
CPC ............ H02K 11/0026; H02K 11/0042; E05F 15/668; E05F 15/665; E05F 15/603; E05F 15/16; E06B 9/68; E06B 2009/6854; E06B 9/70; E05Y 2400/32; E05Y 2400/334; E05Y 2400/337; E05Y 2900/103; E05Y 2900/146
USPC ....................................... 310/68 B
See application file for complete search history.

(56) References Cited

U.S. PATENT DOCUMENTS

| | | | | |
|---|---|---|---|---|
| 2009/0179528 | A1* | 7/2009 | Omura et al. | ......... H02K 11/00 310/68 B |
| 2013/0133447 | A1* | 5/2013 | Leivenzon et al. | ..... F16H 19/02 74/89.16 |

FOREIGN PATENT DOCUMENTS

CN 103075092 A * 5/2013 ............... E05B 9/68

* cited by examiner

*Primary Examiner* — Michael Andrews

(57) ABSTRACT

A gray code driving device for an electric roller shutter contains: a base, a transmission assembly, and a torque detection unit. The base includes an accommodating space for accommodating the transmission assembly and the torque detection unit and includes a rotary cover connected with the transmission assembly. The transmission assembly includes an electric motor for supplying power source, and the base further includes a digital module for controlling the electric motor. The torque detection unit is in connection with the transmission assembly and is driven by the transmission unit to encode gray codes, wherein the torque detection unit is electrically connected with the digital module to transmit the gray codes.

1 Claim, 5 Drawing Sheets

GRAY CODE DRIVING DEVICE FOR ELECTRIC ROLLER SHUTTER

FIELD OF THE INVENTION

The present invention relates to a gray code driving device which is used for an electric roller shutter mounted in a garage or a warehouse to determine rolling length and unrolling length of the electric roller shutter accurately.

BACKGROUND OF THE INVENTION

Conventional electric roller shutter contains: a holder for fixing a tube on a door, plural connecting pieces connected together to form a door plate, and a rotatable wheel mounted on the door plate, wherein the door plate is guided by two guiding grooves on two sides of the door, and an electric motor drives the rotatable wheel to roll and unroll the door plate, thus closing and opening the electric roller shutter.

However, the electric roller shutter is manufactured based on a customized length, so the electric roller shutter cannot be produced at large quantity.

Furthermore, a sensor is fixed on a rail of the door so that when the electric roller shutter is rolled or unrolled at a predetermined length, the sensor sends a stop signal to control rolling or unrolling length of the electric roller shutter. Nevertheless, the sensor can only set a fixed rolling length or unrolling length and its rolling and unrolling speeds cannot be adjusted randomly.

The present invention has arisen to mitigate and/or obviate the afore-described disadvantages.

SUMMARY OF THE INVENTION

The primary objective of the present invention is to provide a gray code driving device which is used for an electric roller shutter mounted in a garage or a warehouse to determine rolling length and unrolling length of the electric roller shutter accurately.

To obtain the above objective, a gray code driving device provided by the present invention contains: a base, a transmission assembly, and a torque detection unit.

The base includes an accommodating space for accommodating the transmission assembly and the torque detection unit and includes a rotary cover connected with the transmission assembly. The transmission assembly includes an electric motor for supplying power source, and the base further includes a digital module for controlling the electric motor. The torque detection unit is in connection with the transmission assembly and is driven by the transmission unit to encode gray codes, wherein the torque detection unit is electrically connected with the digital module to transmit the gray codes.

Preferably, the torque detection unit further includes a first housing, a second housing corresponding to the first housing, a digital sensing module, a rotating disc, and a driving gear. Between the first housing and the second housing is defined a receiving room for receiving the digital sensing module and the rotating disc, and the driving gear is joined with the transmission assembly and has a shaft extending into the receiving room from a central position of the driving gear, wherein the shaft is coaxial with a central position of the rotating disc. The rotating disc has a plurality of first arcuate slots of various lengths defined thereon relative to the central position of the rotating disc, and the digital sensing module has a first signal transmitter corresponding to a first side surface of the rotating disc and has a second signal receiver corresponding to a second side surface of the rotating disc, wherein the digital sensing module is electrically connected with the digital module.

Thereby, the digital module sets operating state of the electric motor, such that the rotating disc, the driving gear, and the transmission assembly are driven to rotate synchronously, and signals from the first signal transmitter to the second signal receiver are received or shielded by using the plurality of first arcuate slots of the rotating disc. For example, when the plurality of first arcuate slots move with a rotation of the rotating disc, the signals from the first signal transmitter are intermittently received by the second signal receiver to be encoded into rotating time and rotating speed which are further saved by the digital module.

Preferably, the rotating disc further has a raised tooth arranged on an outer rim thereof, and the receiving room has a guiding gear rotatably connected thereon to mesh with the raised tooth of the rotating disc. The torque detection unit further includes a sprocket fixed in the receiving room and being coaxial with the shaft of the driving gear, and the sprocket has plural teeth formed around an outer rim thereof to mesh with the guiding gear and has a plurality of second arcuate slots of various lengths defined thereon relative to a central position of the sprocket. The digital sensing module has a second signal transmitter corresponding to a first side surface of the sprocket and has a second signal receiver corresponding to a second side surface of the sprocket.

Accordingly, the gray code driving device of the present invention contains the torque detection unit which operates with the transmission assembly, and the signals from the first signal transmitter are intermittently received by the second signal receiver by ways of the plurality of first arcuate slots to be encoded into the gray codes (i.e., the rotating time and the rotating speed), and then the gray codes are saved and compared with set data by the digital module, thereby determining rolling length and unrolling length of the electric roller shutter accurately.

DETAILED DESCRIPTION OF THE PREFERRED EMBODIMENTS

Figure 1:
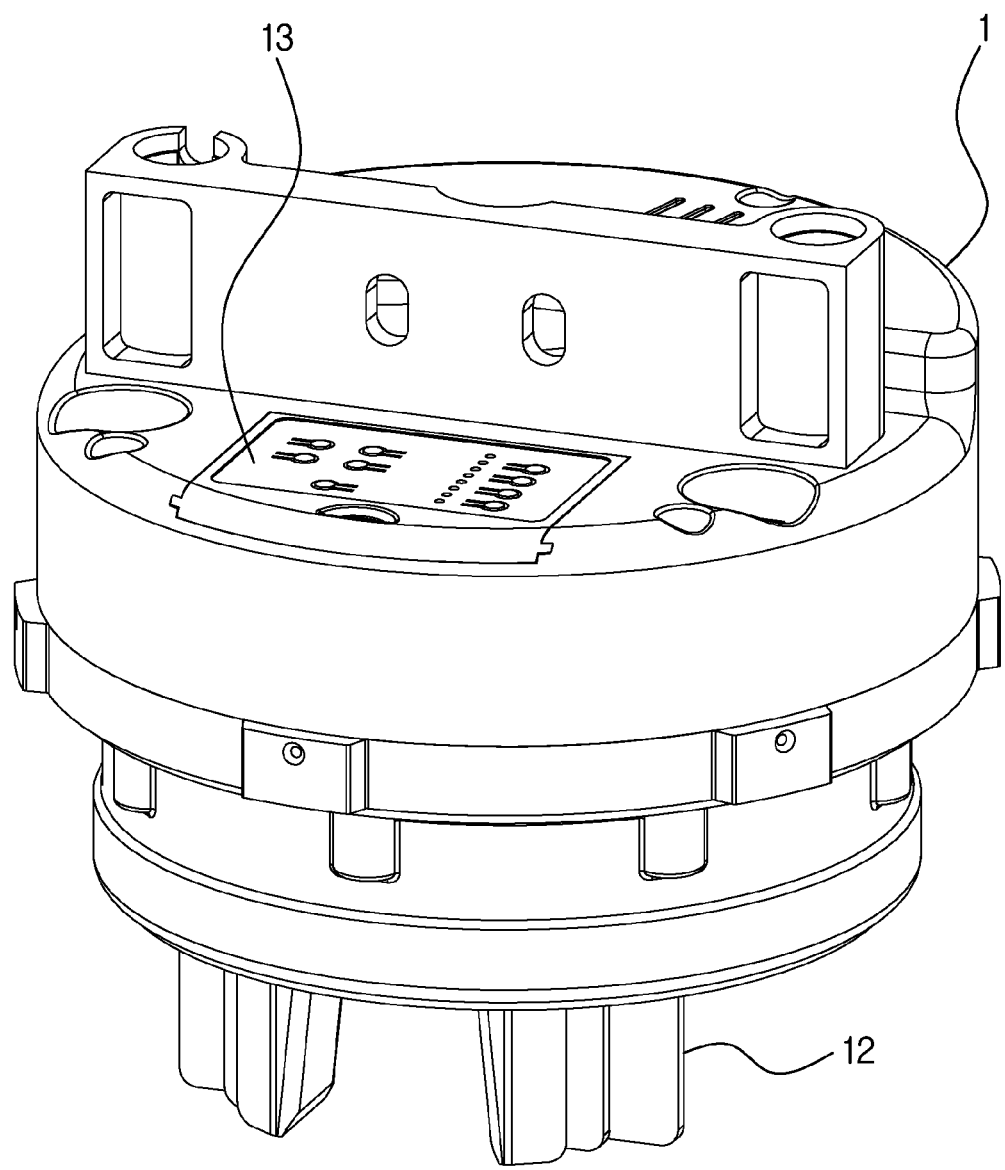
FIG. 1 is a perspective view showing the assembly of a gray code driving device for an electric roller shutter according to a preferred embodiment of the present invention.
Figure 2:
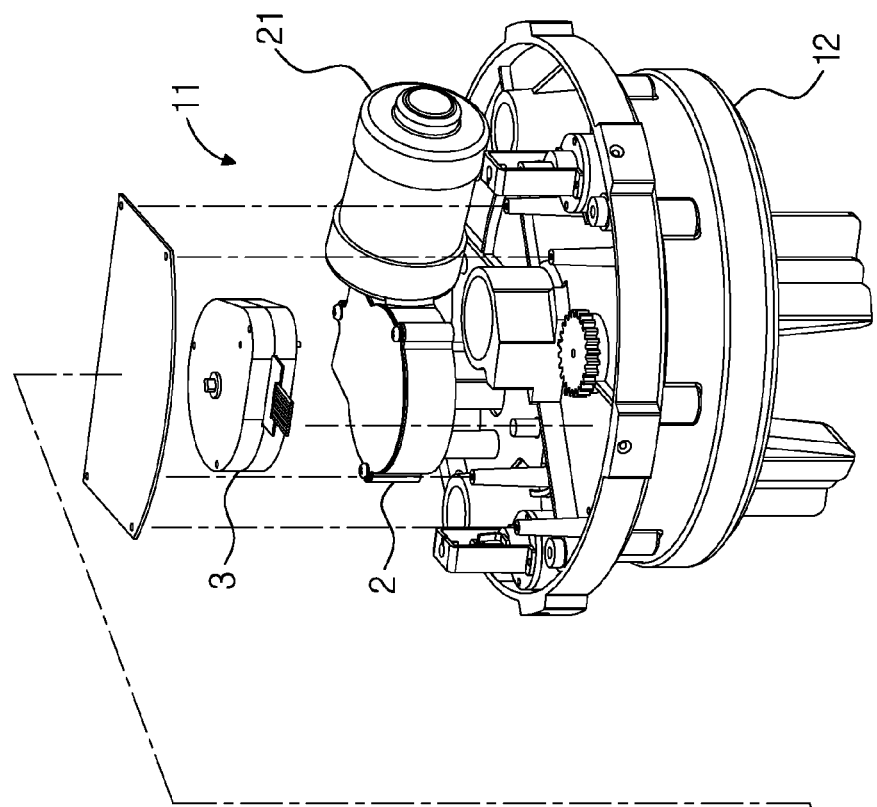
FIG. 2 is a perspective view showing the exploded components of the gray code driving device for the electric roller shutter according to the preferred embodiment of the present invention.
Figure 2:
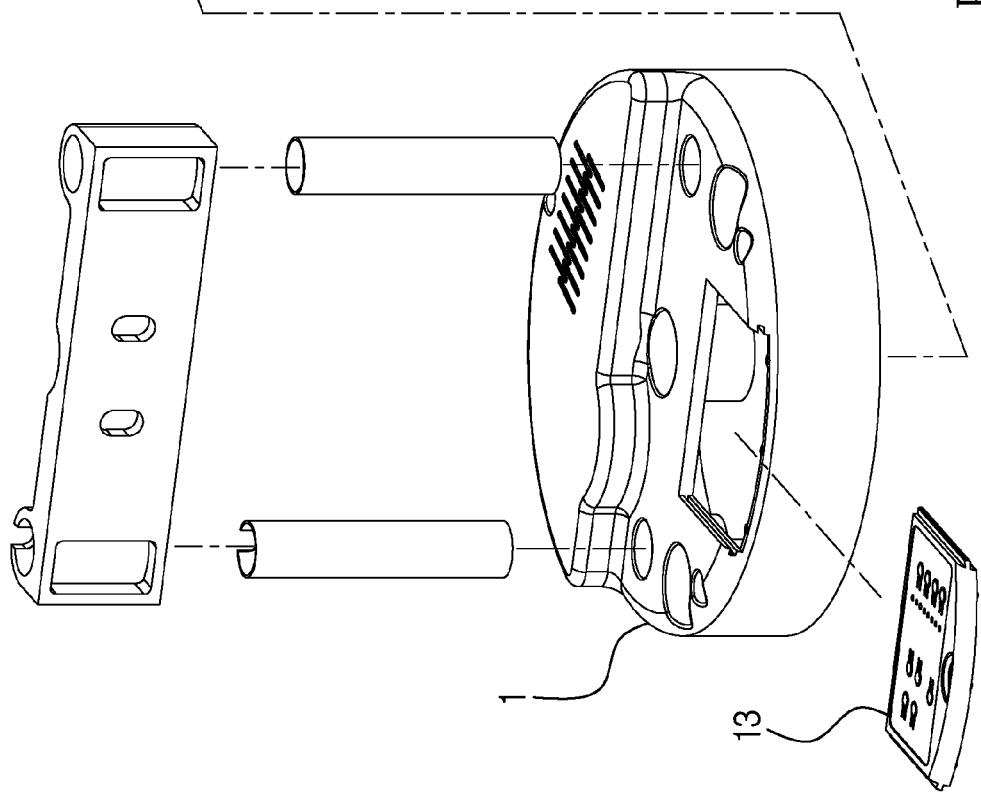
Figure 3:
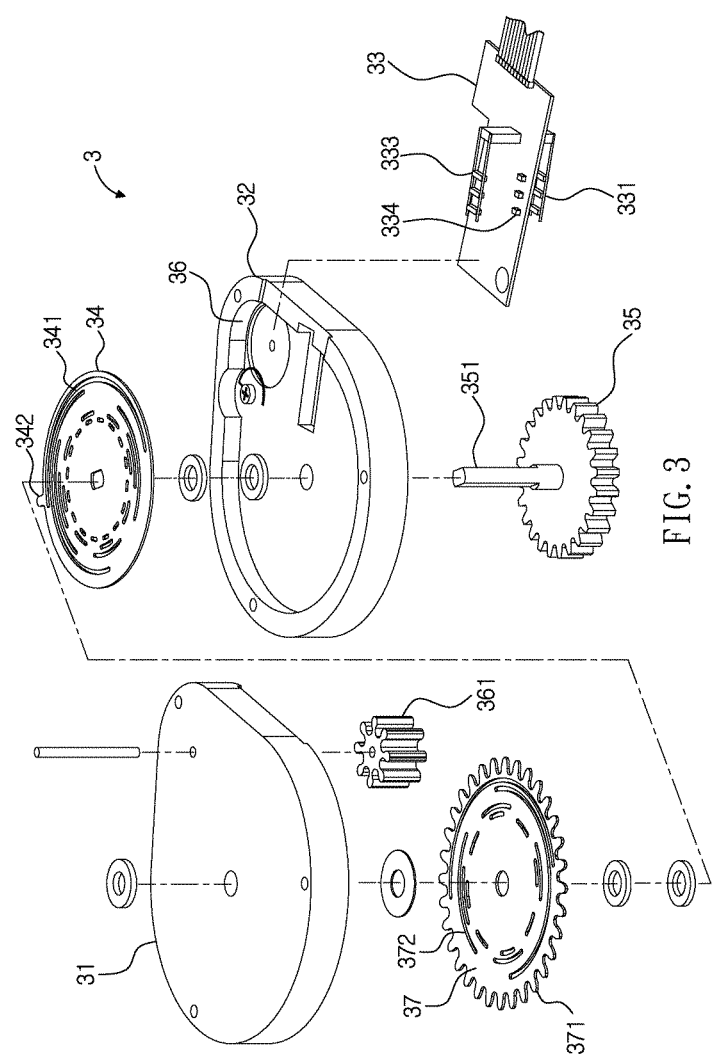
FIG. 3 is a perspective view showing the exploded components of a torque detection unit of the gray code driving device for the electric roller shutter according to the preferred embodiment of the present invention.

A gray code driving device according to a preferred embodiment of the present invention is used for an electric roller shutter mounted in a garage or a warehouse to position the electric roller shutter precisely by ways of a gray encoder. With reference to FIGS. 1-5, the gray code driving device comprises: a base 1, a transmission assembly 2, and a torque detection unit 3.

The base 1 includes an accommodating space 11 for accommodating the transmission assembly 2 and the torque detection unit 3 and includes a rotary cover 12 connected with the transmission assembly 2, wherein the rotary cover 12 is also coupled with the electric roller shutter to drive a rolling or an unrolling of the electric roller shutter. Since such an operation is a well-known art, further remarks are omitted. The transmission assembly 2 includes an electric motor 21 for supplying power source, and the base 1 further includes a digital module 13 for controlling the electric motor 21. The torque detection unit 3 is in connection with the transmission assembly 2 and is driven by the transmission unit 2 to encode gray codes. In addition, the torque detection unit 3 is electrically connected with the digital module 13 to transmit the gray codes.

The torque detection unit 3 further includes a first housing 31, a second housing 32 corresponding to the first housing 31, a digital sensing module 33, a rotating disc 34, and a driving gear 35. Between the first housing 31 and the second housing 32 is defined a receiving room 36 for receiving the digital sensing module 33 and the rotating disc 34, and the driving gear 35 is joined with the transmission assembly 2 and has a shaft 351 extending into the receiving room 36 from a central position of the driving gear 35, wherein the shaft 351 is coaxial with a central position of the rotating disc 34. The rotating disc 34 has a plurality of first arcuate slots 341 of various lengths defined thereon relative to the central position of the rotating disc 34, and the digital sensing module 33 has a first signal transmitter 331 corresponding to a first side surface of the rotating disc 34 and has a second signal receiver 332 corresponding to a second side surface of the rotating disc 34, wherein the digital sensing module 33 is electrically connected with the digital module 13.

Figure 4:
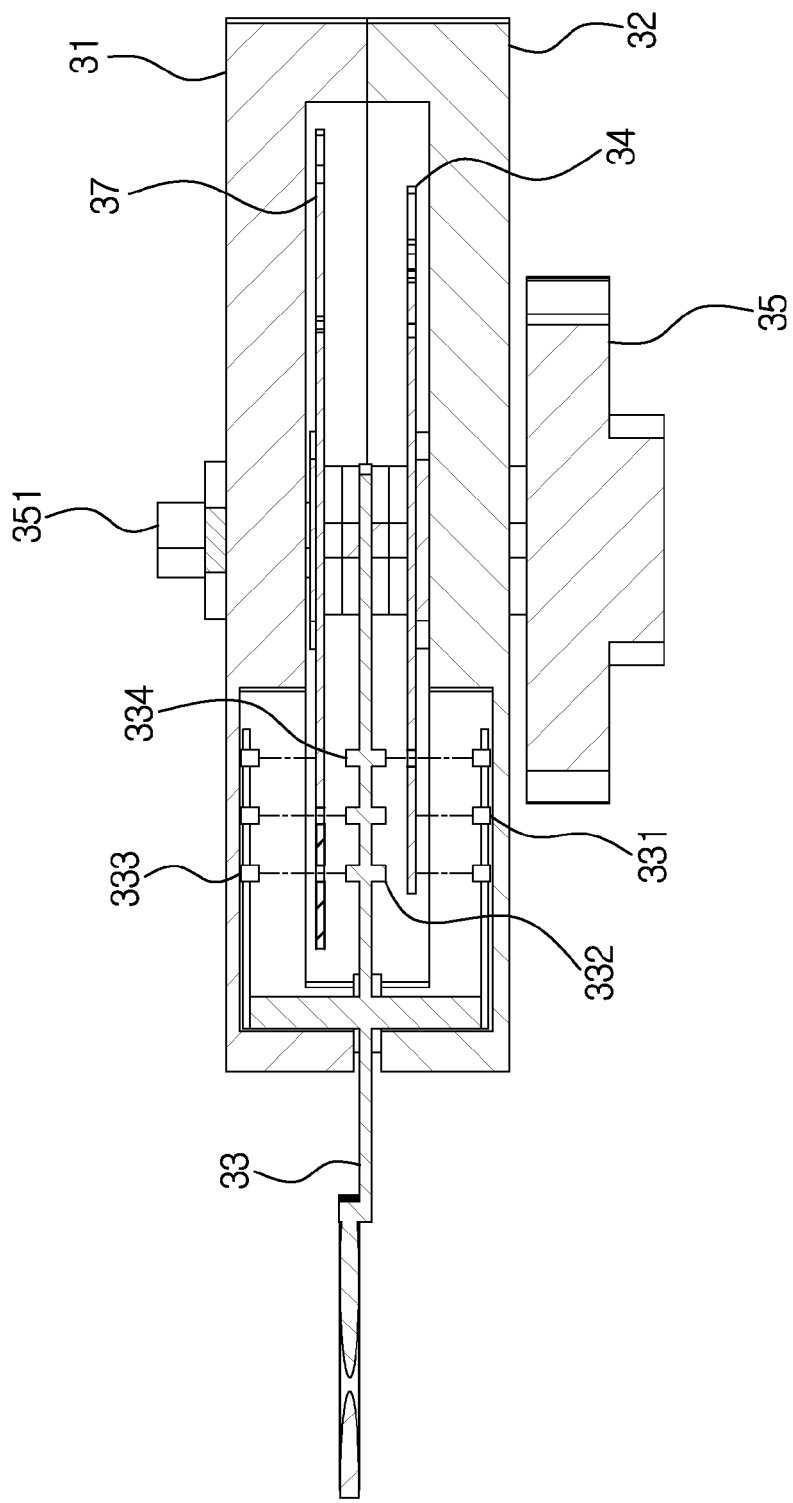
FIG. 4 is a cross sectional view showing the operation of the gray code driving device for the electric roller shutter according to the preferred embodiment of the present invention.
Figure 5:
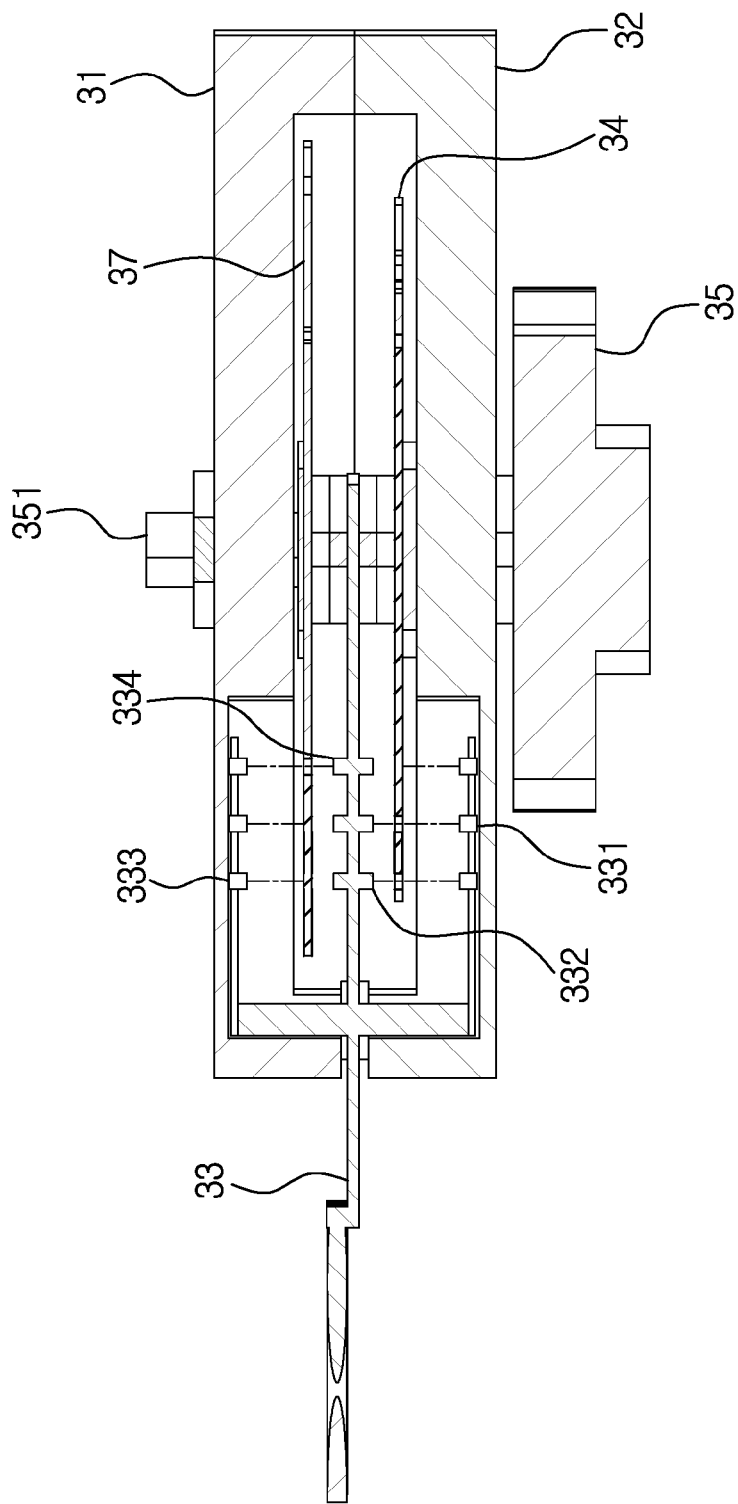
FIG. 5 is another cross sectional view showing the operation of the gray code driving device for the electric roller shutter according to the preferred embodiment of the present invention.

Thereby, the digital module 13 sets operating state of the electric motor 31, such that the rotating disc 34, the driving gear 35, and the transmission assembly 2 are driven to rotate synchronously, and signals from the first signal transmitter 331 to the second signal receiver 332 are received or shielded by using the plurality of first arcuate slots 341 of the rotating disc 34. For example, as shown in FIGS. 4 and 5, when the plurality of first arcuate slots 341 move with a rotation of the rotating disc 34, the signals from the first signal transmitter 331 are intermittently received by the second signal receiver 332 to be encoded into rotating time and rotating speed which are further saved by the digital module 13.

Preferably, the rotating disc 34 further has a raised tooth 342 arranged on an outer rim thereof, and the receiving room 36 has a guiding gear 361 rotatably connected thereon to mesh with the raised tooth 342 of the rotating disc 34. The torque detection unit 3 further includes a sprocket 37 fixed in the receiving room 36 and being coaxial with the shaft 351 of the driving gear 35, and the sprocket 37 has plural teeth 371 formed around an outer rim thereof to mesh with the guiding gear 361 and has a plurality of second arcuate slots 372 of various lengths defined thereon relative to a central position of the sprocket 37. The digital sensing module 33 has a second signal transmitter 333 corresponding to a first side surface of the sprocket 37 and has a second signal receiver 334 corresponding to a second side surface of the sprocket 37, such that when the rotating disc 34 rotates one circle, the guiding gear 361 drives the sprocket 37 to rotate gently, and more signals are transmitted from the second signal transmitter 333 to the second signal receiver 334, thus creating more operating data and avoiding a large size of the rotating disc 34 and/or the sprocket 37.

Accordingly, the gray code driving device of the present invention contains the torque detection unit 3 which operates with the transmission assembly 2, and the signals from the first signal transmitter 331 are intermittently received by the second signal receiver 332 by ways of the plurality of first arcuate slots 341 to be encoded into the gray codes (i.e., the rotating time and the rotating speed), and then the gray codes are saved and compared with set data by the digital module 13, thereby determining rolling length and unrolling length of the electric roller shutter accurately.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A gray code driving device for an electric roller shutter comprising: a base, a transmission assembly, and a torque detection unit; wherein the base includes an accommodating space for accommodating the transmission assembly and the torque detection unit and includes a rotary cover connected with the transmission assembly; the transmission assembly includes an electric motor for supplying power, and the base further includes a digital module for controlling the electric motor; the torque detection unit is in connection with the transmission assembly and is driven by the transmission unit to encode gray codes, wherein the torque detection unit is electrically connected with the digital module to transmit the gray codes;

wherein the torque detection unit further includes a first housing, a second housing corresponding to the first housing, a digital sensing module, a rotating disc, and a driving gear; between the first housing and the second housing is defined a receiving room for receiving the digital sensing module and the rotating disc, and the driving gear is joined with the transmission assembly and has a shaft extending into the receiving room from a central position of the driving gear, wherein the shaft is coaxial with a central position of the rotating disc; the rotating disc has a plurality of first arcuate slots of various lengths defined thereon relative to the central position of the rotating disc, and the digital sensing module has a first signal transmitter corresponding to a first side surface of the rotating disc and has a second signal receiver corresponding to a second side surface of the rotating disc, wherein the digital sensing module is electrically connected with the digital module; and wherein the rotating disc further has a raised tooth arranged on an outer rim thereof, and the receiving room has a guiding gear rotatably connected thereon to mesh with the raised tooth of the rotating disc; the torque detection unit further includes a sprocket fixed in the receiving room and being coaxial with the shaft of the driving gear, and the sprocket has plural teeth formed around an outer rim thereof to mesh with the guiding gear and has a plurality of second arcuate slots of various lengths defined thereon relative to a central position of the sprocket; the digital sensing module has a second signal transmitter corresponding to a first side surface of the sprocket and has a second signal receiver corresponding to a second side surface of the sprocket.

\* \* \* \* \*